No. 786,965. PATENTED APR. 11, 1905.
J. A. FRAZAR.
FUMIGATOR AND INSECT DESTROYER.
APPLICATION FILED MAY 31, 1904.
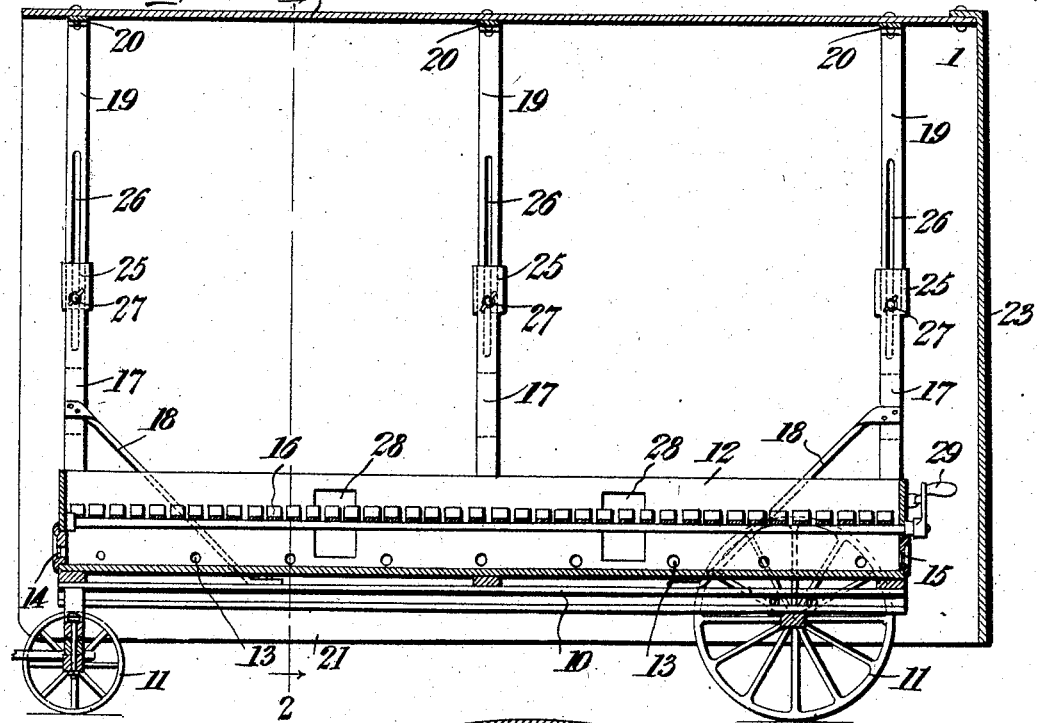
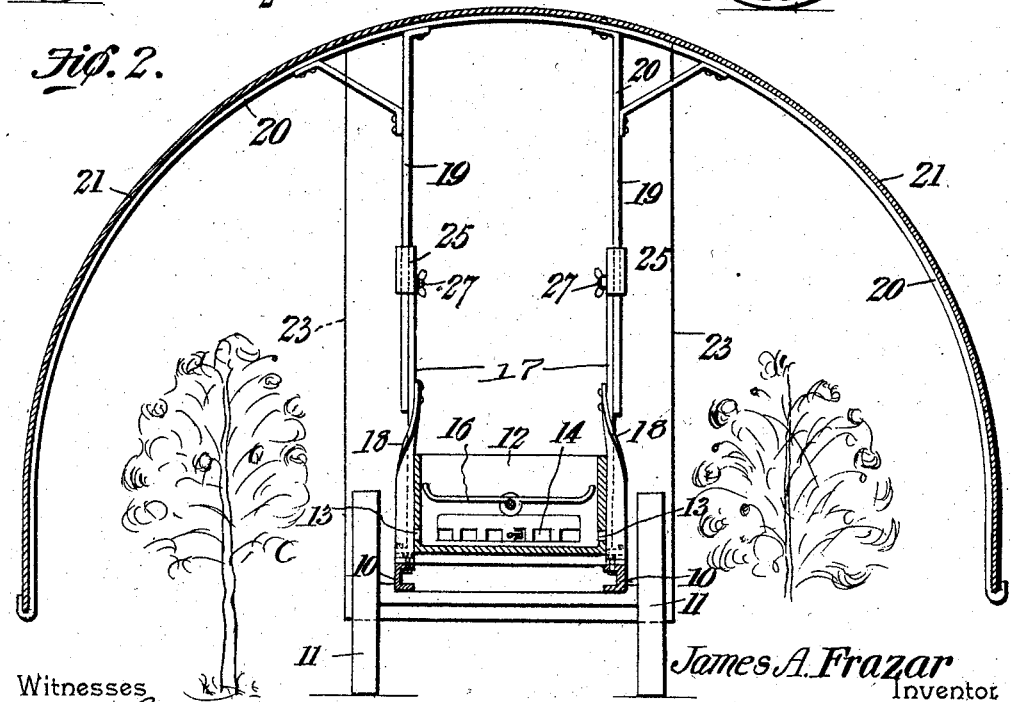

No. 786,965. Patented April 11, 1905.

UNITED STATES PATENT OFFICE.

JAMES A. FRAZAR, OF HENRIETTA, TEXAS.

FUMIGATOR AND INSECT-DESTROYER.

SPECIFICATION forming part of Letters Patent No. 786,965, dated April 11, 1905.

Application filed May 31, 1904. Serial No. 210,558.

*To all whom it may concern:*

Be it known that I, JAMES A. FRAZAR, a citizen of the United States, residing at Henrietta, in the county of Clay and State of Texas, have invented a new and useful Fumigator and Insect-Destroyer, of which the following is a specification.

This invention relates to apparatus employed for destroying injurious insect life upon growing vegetation, and has for its object to produce a simply-constructed and efficient device which may be inexpensively constructed, easily operated, and readily adjusted to vegetation of varying sizes.

With these and other objects in view, which will appear as the nature of the invention is better understood, the same consists in certain novel features of construction, as hereinafter more fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of the advantages, and the right is therefore reserved of making all the changes and modifications which fairly fall within the scope of the invention and the claims made therefor.

In the drawings, Figure 1 is a sectional side elevation, and Fig. 2 is a transverse section of the improved apparatus on the line 2 2 of Fig. 1.

The improved apparatus comprises a supporting-frame 10, preferably of metal bars, and mounted upon carrying-wheels 11 for movement over the ground generally by one or more horses. The frame is surmounted by an elongated combustion-chamber 12 in the form of a sheet-metal pan open at the top and with suitable air-apertures 13 in the sides near the bottom and with firing-doors 14 15 in the ends and also at intermediate points along the sides, if required, as at 28.

Devices of this character are generally required to pass between the rows of the growing plants and must therefore be comparatively narrow to permit them to do so, and in order to secure the requisite area to support the necessary amount of combustible or gas-generating substances or materials the combustion-chamber must be relatively long, as illustrated.

A grating 16 is supported transversely of the chamber 12 to support the gas-generating compounds or materials and may be rotative, if preferred, as by crank 29. Rising from the frame 10 are spaced standards 17, suitably braced, as at 18, and adjustably engaging these standards are other standards, 19, depending from a frame 20, the latter in turn supporting a downwardly-curving deflector or hood member 21.

The overlapping standard-sections 17 and 19 are held together by sleeves 25 and are provided with longitudinal slots 26 to receive holding-bolts 25, by which the vertical adjustments are accomplished, as will be obvious.

The deflector member extends rearwardly of the frame 10 and chamber 12 for some distance and also extends downwardly at the sides relatively close to the ground and spaced some distance from the bearing-wheels.

The deflector is large enough to extend over two full rows of the plants and will entirely envelop them as the device is drawn over them.

At the rear the deflector member is provided with a depending curtain or shield 23, extending across the rear of the combustion-chamber to deflect the fumes and gases to each side as the apparatus is drawn forward, and thus force them laterally and in contact with the plants, so that none of the fumes or gases are permitted to escape; but all are directed into contact with the plants to accomplish the desired results.

Any suitable compound or material may be employed in the chamber 12 and upon the grate 16 which will generate insect-destroying fumes or gases, and it is not desired, therefore, to be limited to any specific article of this character.

If required, the combustion-pan may be provided with non-heat-conductive material to protect delicate plants which might be injuriously effected by the heat generated by the combustion in the chamber.

It will thus be obvious that a simply-constructed and efficient apparatus is produced, which may be adapted to all sizes and forms of plants and by means of which all parts of the plants may be reached by the fumes or gases rising from the chamber and deflected thereon by the members 21 and 23, as above described.

The parts of the frames will preferably be of metal as light as will be consistent with the strains to which they will be subjected, and the member 21 will preferably be of light sheet metal, but under some circumstances may be of canvas or other fabric.

The apparatus will be especially useful in treating cotton, corn, or other similar crops, but may be employed over any plants or vegetation requiring its use.

Having thus described the invention, I claim—

1. In a fumigating apparatus, a wheeled frame, a combustion-chamber carried thereby, spaced vertical standards carried by the frame, a downwardly-curving deflector or hood carried by said standards, and a vertical guard-plate depending from the rear end of the deflector.

2. In a fumigating apparatus, a wheeled frame, sectional standards carried thereby, an open-top combustion-chamber on the frame, and a deflector or hood carried by the sectional standards and vertically adjustable with respect to the frame, said hood extending both laterally and rearwardly of the frame.

3. In a fumigating apparatus, a wheeled frame, a combustion-chamber carried thereby, and a hood or deflector carried by the frame, said hood or deflector being open at the front to permit the passage of the apparatus along or between rows of plants, the rear end of the hood or deflector having a depending shield of a width approximately equal to the width of the frame.

4. In a fumigating apparatus, a wheeled frame, an open-top combustion-chamber arranged therein and provided with a gate, sectional standards secured at intervals to the frame, a transversely-curved hood or deflector carried by the standards, and a depending shield carried by the rear end of the hood or deflector and serving as a closure for that portion of the hood between two adjacent rows of plants.

In testimony that I claim the foregoing as my own I have hereto affixed my signature in the presence of two witnesses.

JAMES A. FRAZAR.

Witnesses:
R. H. PALMER,
W. S. CULWELL.